(12) United States Patent
Naoi

(10) Patent No.: US 8,491,049 B2
(45) Date of Patent: Jul. 23, 2013

(54) FRONTAL STRUCTURE OF VEHICLE

(75) Inventor: Daisuke Naoi, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 95 days.

(21) Appl. No.: 13/175,423

(22) Filed: Jul. 1, 2011

(65) Prior Publication Data

US 2012/0001456 A1   Jan. 5, 2012

(30) Foreign Application Priority Data

Jul. 2, 2010   (JP) .................................. 2010-152382

(51) Int. Cl.
*B62D 25/08*   (2006.01)
*B62D 25/20*   (2006.01)

(52) U.S. Cl.
USPC ................. 296/193.09; 296/193.02

(58) Field of Classification Search
USPC ............. 296/193.02, 193.09, 190.08, 193.06, 296/193.07, 198, 187.08, 187.09, 191, 30, 296/29; 180/90.6
See application file for complete search history.

(56) References Cited

U.S. PATENT DOCUMENTS

| | | | | |
|---|---|---|---|---|
| 5,560,674 A | * | 10/1996 | Tazaki et al. ............. | 296/193.01 |
| 6,830,289 B2 | * | 12/2004 | Miyabayashi ............ | 296/193.07 |
| 7,325,865 B2 | * | 2/2008 | Yamazaki ................. | 296/203.04 |
| 7,458,632 B2 | * | 12/2008 | Yamada et al. ........... | 296/193.07 |

FOREIGN PATENT DOCUMENTS

| | | |
|---|---|---|
| JP | 59-126776 U | 8/1984 |
| JP | 63-59779 U | 4/1988 |
| JP | 05-170139 | 7/1993 |
| JP | 08-113165 | 5/1996 |
| JP | 08-175429 | 7/1996 |
| JP | 10-109666 | 4/1998 |
| JP | 11-291952 | 10/1999 |
| JP | 2005-319941 | 11/2005 |

OTHER PUBLICATIONS

Japanese Office Action, Application No. 2010-152382, Dated Apr. 24, 2012, eight pages.
Japanese Notice of Allowance dated Jul. 31, 2012, JP Application No. 2010-152382, six pages.

* cited by examiner

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A frontal structure of a vehicle includes: a dashboard lower section comprising a longitudinal wall, a tilted wall, and a horizontal wall connected together; a floor frame provided below the tilted wall; a bead formed along the floor frame, wherein the longitudinal wall intersects with the bead at an upper side of the bead; the horizontal wall intersects with the bead at a lower side of the bead; and a ridge line or a plurality of ridge lines of the bead overlap with the floor frame in an upper-lower direction.

3 Claims, 8 Drawing Sheets

FRONTAL STRUCTURE OF VEHICLE

TECHNICAL FIELD

The present invention relates to a frontal structure of a vehicle.

Priority is claimed on Japanese Patent Application No. 2010-152382, filed Jul. 2, 2010, the content of which is incorporated herein by reference.

BACKGROUND ART

Generally speaking, a vehicle body includes a cabin (vehicle chamber), an engine room, and a floor panel. The engine room is positioned in front of the cabin. This engine room stores an engine and the like. The floor panel is placed at a lower surface of the cabin. A pair of front side frames is placed in the engine room so as to be elongated in the front-rear direction. The pair of front side frames makes up the left and right frame of the engine room. In addition, the floor panel is supported by a floor frame. This floor frame is placed below the floor panel so that the floor frame is elongated along the front-rear direction.

Moreover, a pair of front pillars and a pair of side sills are continuously formed at both corners of the frontal portion of the cabin in a vehicle width direction. At the same time, a cowl is bridged between the upper portions of both front pillars. The cowl is elongated in the vehicle width direction. The cowl is structured so that the cowl has a closed cross section. Furthermore, a dashboard lower section (a dash panel) is provided at a portion surrounded by the floor panel and the cowl. The dashboard lower section separates the engine room from the cabin. In addition, a rear end of the pair of front side frames is connected to the dashboard lower section.

Here, the dashboard lower section is a component that separates the engine room from the cabin. As a result, the dashboard lower section is often formed with a thin plate in order to reduce the weight of the dashboard lower section. Therefore, there is a possibility that the dashboard lower section undergoes a membrane oscillation when the vehicle is running and the like. Therefore, a technology has been developed to increase the robustness of the dashboard lower section by forming a plurality of beads on the dashboard lower section. (See, for example, Japanese Unexamined Patent Application, First Publication No. H8-175429.)

DISCLOSURE OF INVENTION

Incidentally, in order to absorb a frontal collision load with a front side frame, a configuration may be made so that a mid-section of this front side frame in the front-rear direction can be bent and deformed in an upward direction. In this case, it is difficult for the front side frame to absorb the frontal collision load completely. This load is transmitted to the dashboard lower section. Therefore, there is a demand to enhance the robustness of the dashboard lower section against frontal collision loads.

However, according to the technology described above, there is a problem in that a bead cannot be formed easily in an efficient manner in order to enhance the robustness of the dashboard lower section against frontal collision loads because there may be a spatial restriction on the cabin. In addition, there is a problem in that a floor frame is not used effectively to enhance the robustness of the dashboard lower section.

The present invention is made according to the concerns described above. Therefore, an object of the present invention is to provide a frontal structure of a vehicle which can enhance the robustness of the dashboard lower section against a frontal collision load.

In order to solve the above problem, a frontal structure of a vehicle employs the following configuration:

(1) An aspect of the present invention is a frontal structure of a vehicle including a dashboard lower section comprising a longitudinal wall, a tilted wall, and a horizontal wall connected together; a floor frame provided below the tilted wall; a bead formed along the floor frame, wherein the longitudinal wall intersects with the bead at an upper side of the bead; the horizontal wall intersects with the bead at a lower side of the bead; and a ridge line or a plurality of ridge lines of the bead overlap with the floor frame in an upper-lower direction.

(2) Another aspect of the present invention is a frontal structure of a vehicle including a dashboard lower section; a longitudinal wall extending along the dashboard lower section in a perpendicular direction; a tilted wall extending as a descending slope from a lower portion of the longitudinal wall towards a rear direction; a horizontal wall extending from a lower portion of the tilted wall towards a rear direction and a horizontal direction; a floor frame provided below the dashboard lower section, the floor frame extending along a front-rear direction; and a longitudinal bead formed on the tilted wall along a direction in which the floor frame extends. At least one longitudinal bead is formed. In addition, an upper end part of the longitudinal bead is connected to the longitudinal wall. Further, a lower end part is connected to the horizontal wall. Moreover, a ridgeline of the longitudinal bead overlaps with a ridgeline of the floor frame in an upper-lower direction.

Here, once a frontal collision load is received, a midsection of the front side frame in the front-rear direction is bent and deformed in an upward direction. Thus, a frontal portion warps upwards, with a rear end of the front side frame being the center. As a result, a load is imposed on the dashboard lower section in a front-lower direction, i.e., in a direction of compression.

When the load is imposed in this way, a longitudinal bead is formed on the tilted wall of the dashboard lower section along a direction in which the floor frame is elongated. An upper end part of this longitudinal bead is connected to the longitudinal wall. At the same time, a lower end part is connected to the horizontal wall. Therefore, a dashboard lower section can obtain a high degree of robustness against a load that is imposed in a direction of compression.

In addition, the longitudinal bead is formed at a position overlapping with the ridge line of the lower frame in the upper-lower direction. Therefore, the load received by the longitudinal bead can be transmitted efficiently to the floor frame. As a result, it is possible to enhance the robustness of the dashboard lower section against a frontal collision load.

(3) The frontal structure of a vehicle may be configured as follows: A plurality of longitudinal beads are formed on the dashboard lower section. In addition, a width of each of the plurality of longitudinal beads in a left-right direction is smaller than a width of the floor frame in the left-right direction.

According to this configuration, it is possible to lower the height to which the longitudinal bead is uplifted. At the same time, it is possible to prevent the spatial area inside the vehicle chamber from decreasing. Furthermore, it is possible to further enhance the robustness of the dashboard lower section with respect to a front collision load imposed on the dashboard lower section.

(4) The frontal structure of a vehicle may be configured as follows: The frontal structure of a vehicle further includes a bifurcation part at a rear end of the front side frame. Here, the front side frame is placed at an engine room side of the dashboard lower section. The bifurcation part includes a first extension part and a second extension part. The first extension part extending from a rear end of the front side frame towards a tunnel part formed at a central lower part of the dashboard lower section. The second extension part extending from a rear end of the front side frame towards a side sill provided at a left and right side part of the dashboard lower section. In addition, the longitudinal bead is formed at a position corresponding to a triangular region formed by the first extension part and the second extension part of the bifurcation part.

According to this configuration, a frontal collision load imposed on a triangular region may be received by a longitudinal bead which has a high degree of robustness. In this way, it is possible to further enhance the robustness of the dashboard lower section against a front collision load.

(5) The frontal structure of a vehicle may be configured as follows: The floor frame is provided in the triangular region. In addition, the floor frame and the front side frame are placed along a line.

According to this configuration, it is possible to reinforce the floor frame with a longitudinal bead. Thus, it is not necessary to enlarge the floor frame or to thicken the floor frame in order to enhance the robustness of the floor frame. As a result, it is possible to reduce the weight of the floor frame.

(6) The frontal structure of a vehicle may be configured as follows: The frontal structure of a vehicle further includes a subframe fixed and connected to a lower side of the dashboard lower section via the bifurcation part, and a retreating bead provided so as to avoid contacting a fixing component fixing and connecting the subframe and the dashboard lower section. A position of the longitudinal bead is determined to be at a position corresponding to the floor frame by making the retreating bead abut against the fixing component.

According to this configuration, a plurality of beads may be easily formed. At the same time, it is possible to enhance the precision of the assembling operation as well as enhance the operability of assembly.

According to the present invention, the dashboard lower section can obtain a high degree of robustness with respect to a load being imposed in a direction of compression. In addition, the longitudinal bead is formed at a position overlapping with the ridge line of the lower frame in the upper-lower direction. Therefore, the load received by the longitudinal bead can be transmitted efficiently to the floor frame. As a result, it is possible to enhance the robustness of the dashboard lower section against a frontal collision load.

BEST MODE FOR CARRYING OUT THE INVENTION (Frontal Structure of Vehicle)
(Dashboard Lower Section)

Hereunder, a first embodiment of a frontal structure of a vehicle according to an aspect of the present invention is described with reference to the drawings. In the following description, a frontal direction in which the vehicle is moving may be simply referred to as a "frontal direction," a rear direction which is opposite to the direction in which the vehicle is moving may be simply referred to as a "rear direction," a direction to the right in the vehicle width direction may be simply referred to as a "right direction," a direction to the left in the vehicle width direction may be simply referred to as a "left direction," an upward direction which is opposite to the direction of the gravitational force may be simply referred to as an "upper direction," and a lower direction which corresponds to the direction of the gravitational force applies may be simply referred to as a "lower direction."

Figure 1:
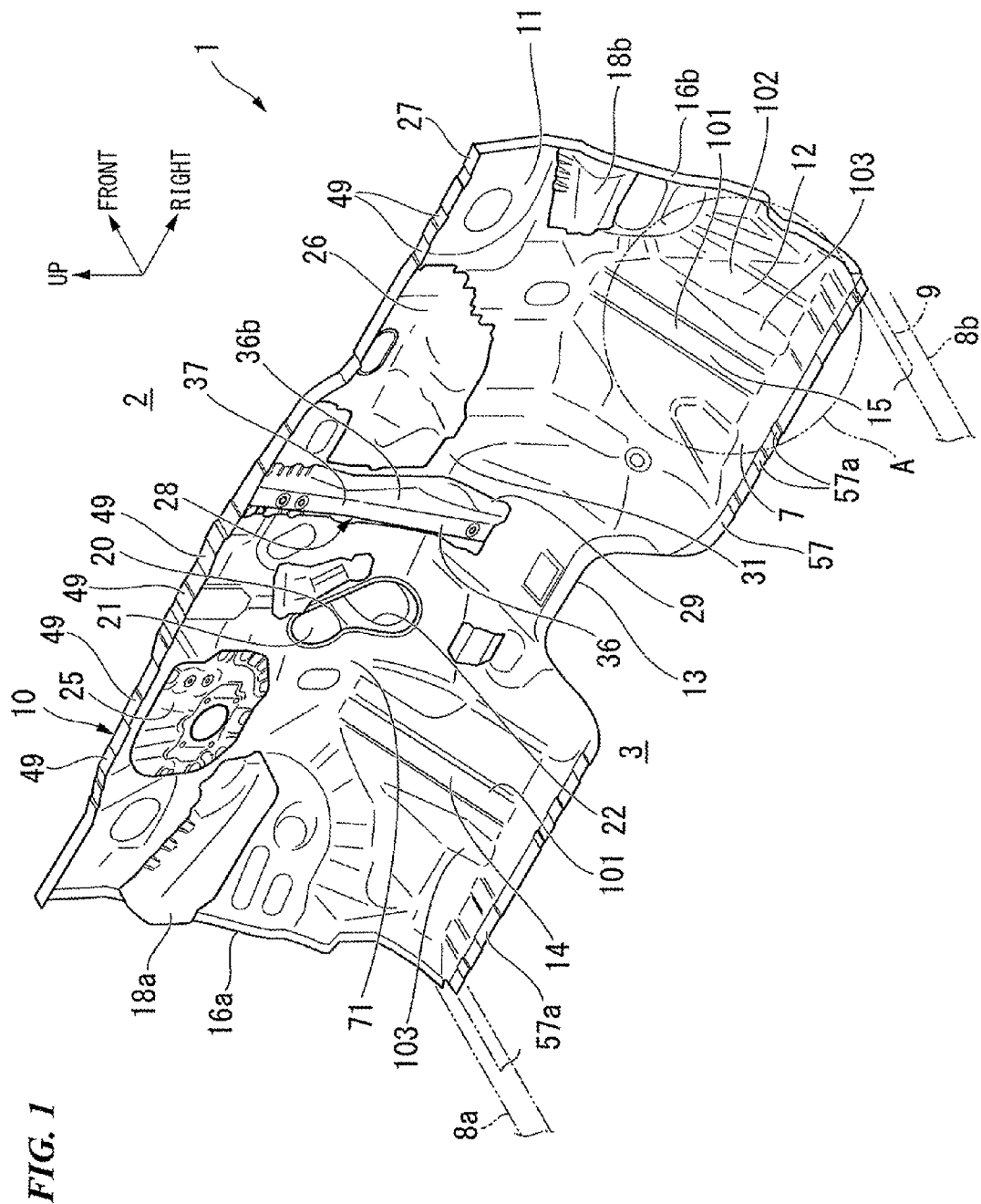
FIG. 1 is a perspective view of a dashboard lower section according to an aspect of the present invention seen from a cabin side.
Figure 2:
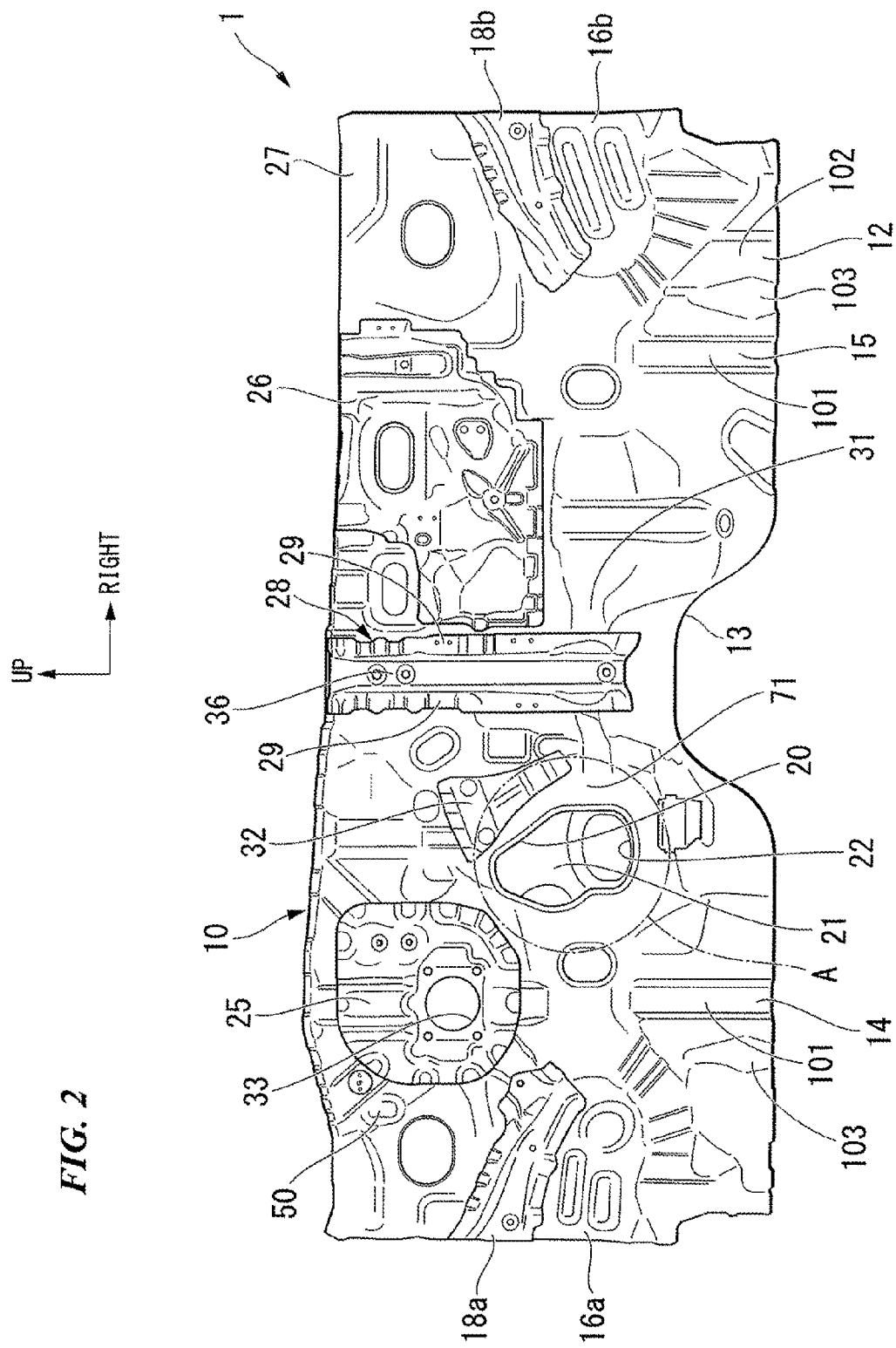
FIG. 2 is a planar view of a dashboard lower section according to an aspect of the present invention seen from a cabin side.
Figure 3:
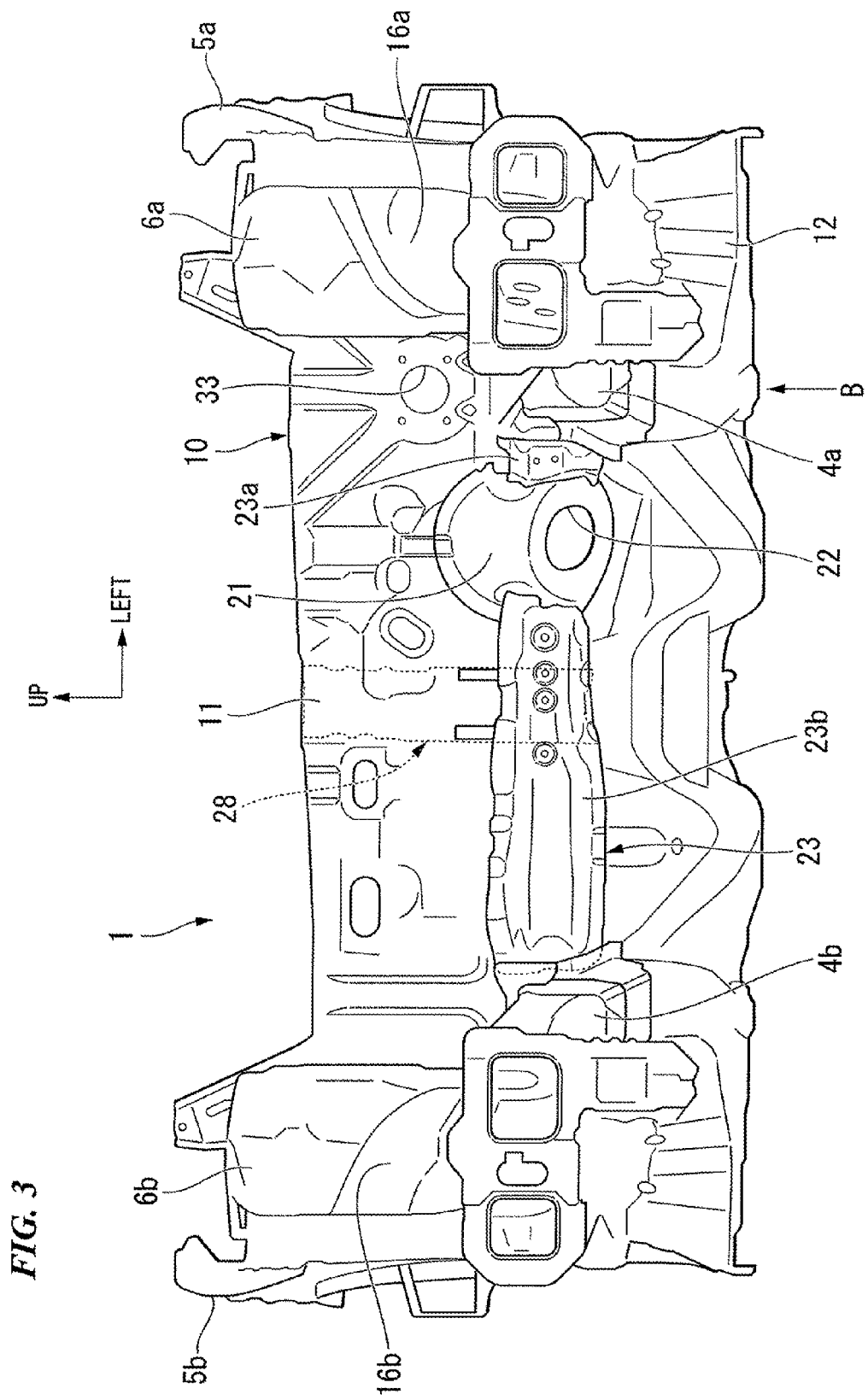
FIG. 3 is a planar view of a dashboard lower section according to an aspect of the present invention seen from an engine room side.

FIG. 1 is a perspective view of a dashboard lower section seen from a cabin side. FIG. 2 is a planar view of a dashboard lower section seen from a cabin side. FIG. 3 is a planar view of the dashboard lower section seen from an engine room side.

As shown in FIGS. 1-3, a vehicle frontal structure 1 includes a frontal side frame 4a, 4b, a front pillar 5a, 5b, an upper member 6a, 6b, and a dashboard lower section 10. The frontal side frame 4a, 4b is positioned at a frontal side. A pair of frontal side frames 4a, 4b make up the left and right frames of an engine frame 2. The front pillar 5a, 5b is placed at a rear side with respect to the frontal side frames 4a, 4b. At the same time, the front pillar 5a, 5b is placed at the left and right outer sides with respect to the frontal side frame 4a, 4b. Further, the front pillar 5a, 5b extends in the upper-lower direction. The upper member 6a, 6b is placed above the front side frames 4a, 4b. The front ends of each of the upper members 6a, 6b are welded to the front ends of the front side frame 4a, 4b. The rear ends of each of the upper members 6a, 6b are welded to the front pillar 5a, 5b. The dashboard lower section 10 separates the engine room 2 and the cabin 3 positioned behind the engine room 2. The dashboard lower section 10 is welded to the front side frames 4a, 4b, the front pillars 5a, 5b, and the upper members 6a, 6b.

The dashboard lower section 10 is formed by applying a pressing operation to a planar metallic component. The dashboard lower section 10 comprises a longitudinal wall 11, a tilted wall 12, and a horizontal wall 7. The longitudinal wall 11 is positioned along an upper-lower direction. The tilted wall 12 is extended as a descending slope from a lower portion of the longitudinal wall 11 in a rear direction. The horizontal wall 7 extends from a rear rim of the tilted wall 12 toward a rear direction of the horizontal direction. A flange part 57 is provided at a rear side rim of the horizontal wall 7. The flange part 57 extends in the left-right direction. A plurality of beads 57a are provided on the flange part 57. The beads 57a protrude in the upper direction.

In addition, a floor panel 9 is welded to the flange part 57. Moreover, the floor panel 9 is placed at both the left and right sides of the flange part 57. Each floor panel 9 is welded to the side sill 8a, 8b. The side sill 8a, 8b extends in the front-rear direction. Furthermore, the floor panel 9 is placed below the side sill 8a, 8b. The floor panel 9 is supported by a floor frame 91 which extends in the front-rear direction. The floor frame 91 is described below.

At a boundary part 71 of the dashboard lower section 10 between the longitudinal wall 11 and the tilted wall 12, a wheel housing part 16a is provided at the left side, and a wheel housing part 16b is provided at the right side. Each of the wheel housing parts 16a, 16b is formed so as to expand towards a cabin 3 side. Gazettes 18a, 18b are provided respectively at the upper portions of the wheel housing parts 16a, 16b. The rear ends of each of the front side frames 4a, 4b are spot-welded to the central end part, with respect to the vehicle width direction, of each of the gazettes 18a, 18b. The dashboard lower section 10 is placed between the gazette 18a and the front side frame 4a, and between the gazette 18b and the front side frame 4b. On the other hand, the front pillar 5a is spot-welded to an outer side end part, with respect to the vehicle width direction, of the gazette 18a. Further, the front pillar 5b is spot-welded to an outer side end part, with respect to the vehicle width direction, of the gazette 18b.

A bend section 27 is formed at an upper rim of the longitudinal wall 11 of the dashboard lower section 10. The bend section 27 bends and extends towards the rear direction. A plurality of beads 49 are formed on the bend section 27 along the front-rear direction. The beads 49 protrude upwards, and are placed along the longitudinal direction of the bend section 27.

On the other hand, a tunnel part 13 is integrally to a central section, with respect to the vehicle width direction, of the tilted wall 12 and the horizontal wall 7. The tunnel part 13 expands upwards. A driver-seat-side step part 14 is positioned to the left of the tunnel part 13. A passenger-seat-side step part 15 is positioned to the right of the tunnel part 13. The tunnel part 13 is placed between the driver-seat-side step part 14 and the passenger-seat-side step part 15.

Further, a center frame 28 is provided between the bend section 27 of the longitudinal wall 11 and the tunnel part 13. The center frame 28 extends in the upper-lower direction. This center frame 28 is a reinforcing member that enhances the rigidity of the dashboard lower section 10. The center frame 28 is configured so that the cross section is shaped approximately like a hat. A closed-cross section structure is formed by spot-welding an opening side of the center frame 28 towards the dashboard lower section 10 side.

An opening part 20 for a steering wheel is formed at a boundary part 71 of the driver-seat-side step part 14 between the longitudinal wall 11 and the tilted wall 12. The opening part 20 for the steering wheel connects the engine room 2 and the cabin 3. A steering shaft (not diagrammed) is inserted in the opening part 20 for the steering wheel.

Further, an acceleration pedal bracket 32 is provided on a surface of the longitudinal wall 11 at the cabin 3 side. The acceleration pedal bracket 32 is used to assemble an acceleration pedal (not diagrammed). This acceleration pedal bracket 32 is provided at an upper right side of the opening part 20 for the steering wheel. Further, an installation hole 33 is provided on the longitudinal wall 11. The installation hole 33 is used to install a brake master cylinder (not diagrammed). This installation hole 33 is placed at an upper left side of the opening part 20 for the steering wheel.

A master cylinder stiffener 25 is provided on a surface of the longitudinal wall 11 at a cabin 3 side. The position of the master cylinder stiffener 25 corresponds to the installation hole 33. The master cylinder stiffener 25 is configured so that a pressing operation is performed on a planar metallic component, thereby forming an irregular surface. A brake master cylinder (not diagrammed) is fixed to this master cylinder stiffener 25.

Further, a damping material fixing panel 26 is fixed on the longitudinal wall 11 at an upper portion. The damping material fixing panel 26 is positioned to the right of the tunnel part 13. The damping material fixing panel 26 fixes a melting sheet (not diagrammed), which is attached as a damping material of the dashboard lower section 10. The damping material fixing panel 26 is configured so that a pressing operation is performed on a planar metallic component, thereby forming an irregular surface.

Here, a steering joint cover 21 is attached to the opening part 20 for the steering wheel which is formed at a boundary part 71 between the longitudinal wall 11 and the tilted wall 12. The steering joint cover 21 covers the opening part 20 for the steering wheel. The steering joint cover 21 is assembled to the opening part 20 for the steering wheel from the engine room 2 side.

The steering joint cover 21 is shaped as a cup. The steering joint cover 21 is formed so as to bulge towards the engine room 2 side. A joint insertion opening 22 is formed on the steering joint cover 21. The joint insertion opening 22 is used to insert a steering shaft (not diagrammed) and a universal joint connected to the steering shaft.

Furthermore, at a surface at an engine room 2 side of the dashboard lower section 10, a dashboard cross member 23 is provided at a position corresponding to the steering joint cover 21. The dashboard cross member 23 bridges the left and right front side frames 4a, 4b. The dashboard cross member 23 is formed so that the cross section is shaped approximately as a hat. The dashboard cross member 23 is used, for example, to enhance the rigidity of the dashboard lower section 10 and to scatter the frontal collision load. A closed cross section structure is formed by spot-welding an opening side of the dashboard cross member 23 towards the dashboard lower section 10 side.

Furthermore, the dashboard cross member 23 is configured to be divided by the steering joint cover 21 into left and right sides. In other words, the dashboard cross member 23 is configured by the left cross member 23a and the right cross member 23b.

Furthermore, an end of each of the left and right cross members 23a and 23b is spot welded to the steering joint cover 21. In other words, the left and right cross members 23a, 23b are connected via the steering joint cover 21. Meanwhile, each of the other ends of the left and right cross members 23a, 23b are spot-welded respectively to the corresponding left and right front side frames 4a, 4b.

Incidentally, at a surface at a cabin 3 side of the dashboard lower section 10, a concaved part 31 is formed at a component corresponding to the right cross member 23b so that the concaved part 31 is elongated in the left-right direction. The concaved part 31 is formed by making the dashboard lower section 10 bulge towards the engine room 2 side.

In this way, it is possible to further enhance the rigidity of a component corresponding to the dashboard cross member 23 of the dashboard lower section 10.

Figure 4:
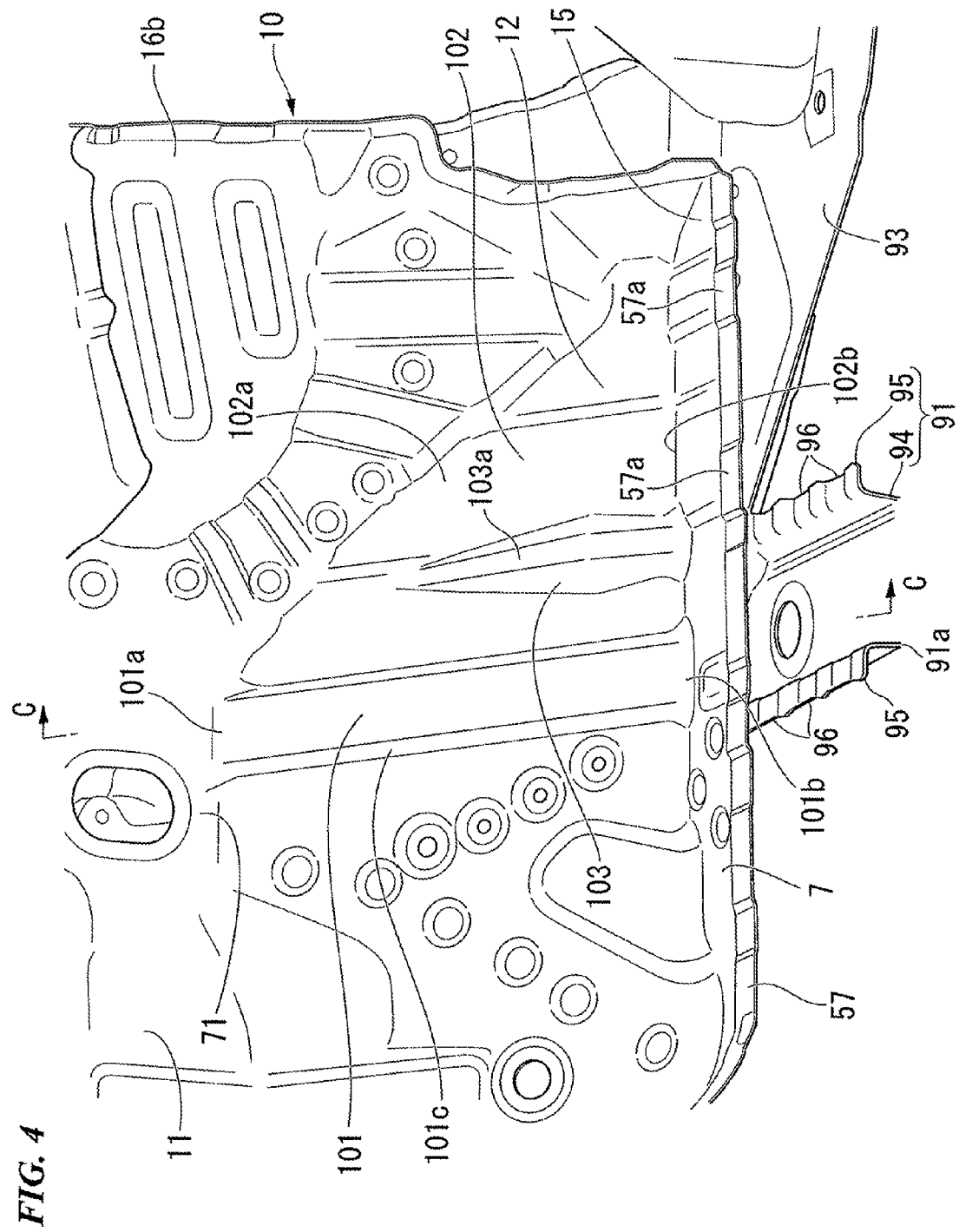
FIG. 4 is an enlarged perspective view of portion A in FIG. 1.
Figure 5:
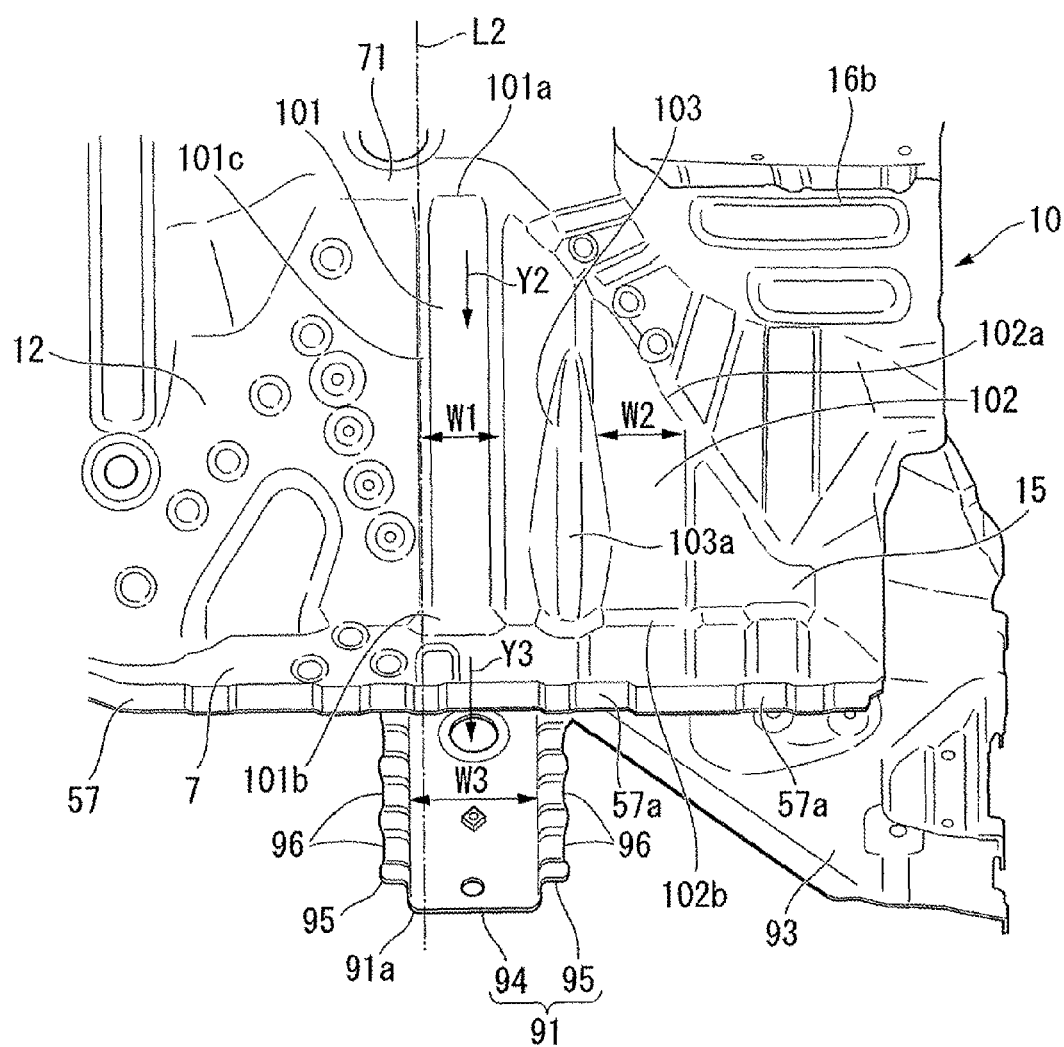
FIG. 5 is a frontal view of FIG. 4.
Figure 6:
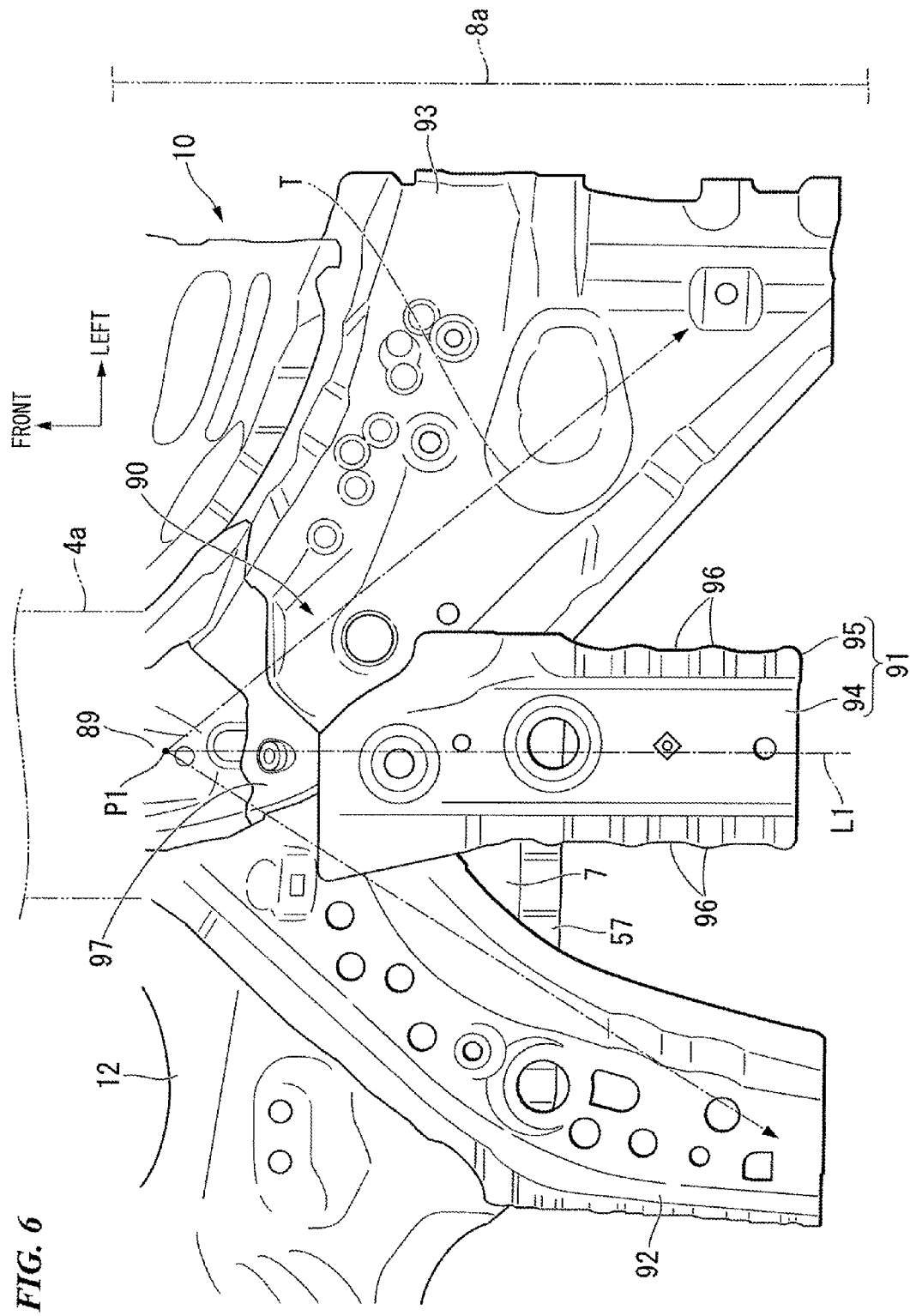
FIG. 6 is a view of FIG. 3 seen from arrow B.
Figure 7:
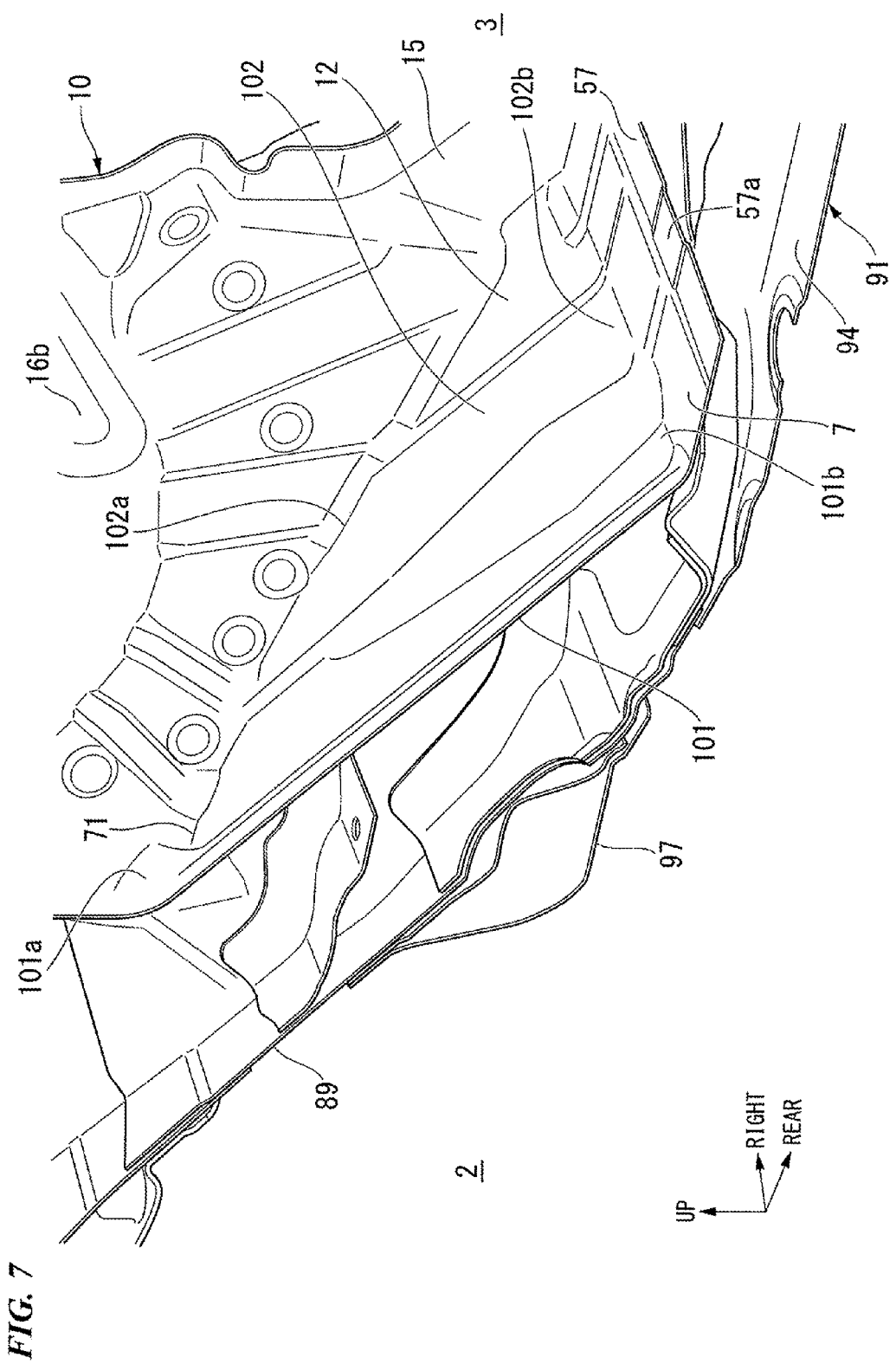
FIG. 7 is a cross sectional perspective view along line C-C in FIG. 4.
Figure 8:
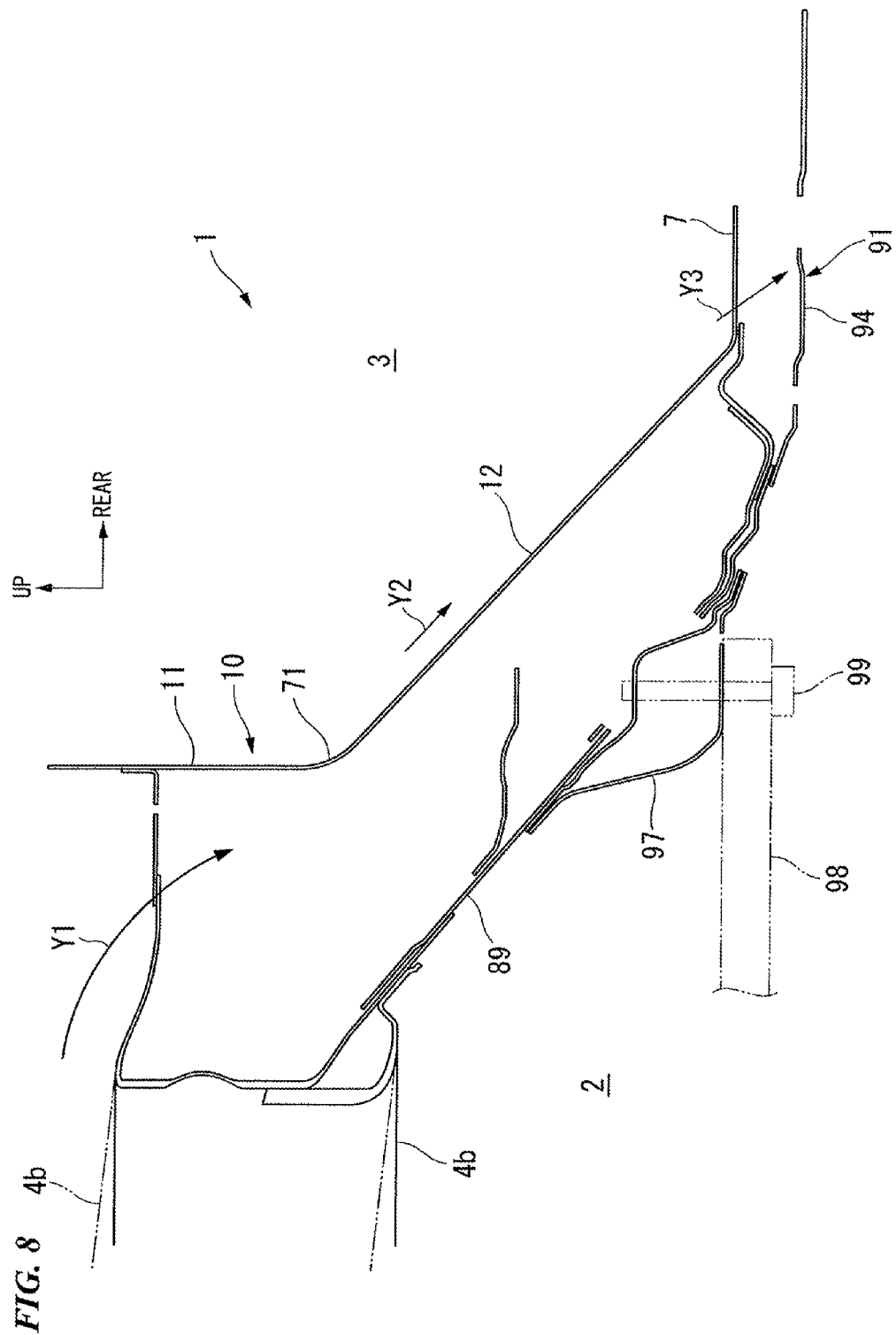
FIG. 8 is a cross sectional diagram along line C-C in FIG. 4.

FIG. 4 is an enlarged perspective view of portion A in FIG. 1. FIG. 5 is a frontal view of FIG. 4. FIG. 6 is a view of FIG. 3 seen from arrow B. FIG. 7 is a cross sectional perspective view along line C-C in FIG. 4. FIG. 8 is a cross sectional diagram along line C-C in FIG. 4.

As shown in FIGS. 3-8, each of the gazettes 18a, 18b is connected respectively to each of the rear ends of the front side frames 4a, 4b. The dashboard lower section 10 is placed between the gazettes 18a, 18b and the front side frames 4a, 4b. In addition, a bifurcation part 90, 90 is connected to the rear ends of the front side frames 4a, 4b via a reinforcer 89. The bifurcation part 90, 90 is provided along a back surface of the dashboard lower section 10 at an engine room 2 side.

Each bifurcation part 90, 90, connected to each front side frame 4a, 4b, is configured the same. Therefore, in FIGS. 4-8, in order to make it easier to view the diagram, either one of the front side frame 4a at the left side or the front side frame 4b at the right side is selected as appropriate to be shown in the diagram.

The bifurcation part 90 comprises a front side frame bracket 92 and a side sill front extension 93. The front side frame bracket 92 extends from a rear end of the front side frame 4a, 4b towards a tunnel part 13 side of the dashboard lower section 10. The side sill front extension 93 extends from a rear end of the front side frame 4a, 4b towards a corresponding left or right side sill 8a, 8b side.

In addition, a floor frame 91 provided so as to be extended on a triangular region T over a central line L1 passing through peak P1 at a rear end side of the front side frame 4a, 4b. The triangular region T is formed by the front side frame bracket 92 and the side sill front extension 93.

In other words, a floor frame 91 is provided so as to be extended from a base end of the front side frame bracket 92 and the side sill front extension 93 in a rear direction of the front-rear direction. Further, each floor frame 91, 91 and the front side frame 4a, 4b are positioned along one straight line (i.e., a central line L1).

The floor frame 91 is configured so that the cross section is shaped approximately as a hat. The floor frame 91 is placed in a condition in which the opening side faces upwards. In other words, the floor frame 91 is integrally configured by a frame main body 94 and a flange part 95. The frame main body 94 is formed so that the cross section is shaped approximately like the letter U. The flange part 95 bends and extends from both side rimes of the frame main body 94 towards an outer side. Further, a front end of the frame main body 94 is spot-welded to the base end of the front side frame bracket 92 and the side sill front extension 93. At the same time, a flange part 95 is spot-welded to the horizontal wall 7 of the dashboard lower section 10 and the floor panel 9.

According to such a configuration, a closed cross section structure is formed between the horizontal wall 7 of the dashboard lower section 10, the floor panel 9, and the floor frame 91.

Further, a plurality of beads 96 are formed on the flange part 95 of the floor frame 91 along the longitudinal direction. In this way, a configuration is made to enhance the rigidity of the floor frame 91.

Moreover, a bracket 97 for attaching a subframe is provided at a triangular region T near a peak P1 at a rear end side of the front side frame 4a, 4b. The triangular region T is formed by the front side frame bracket 92 and the side sill front extension 93. The bracket 97 for attaching a subframe is a bracket used to attach a subframe 98 below the dashboard lower section 10.

The subframe 98 is fixed to the bracket 97, for attaching a subframe, with a bolt 99. The bolt 99 is screwed into the bracket 97 for attaching a subframe. An end of the bolt 99 is protruding upwards from the reinforcer 89.

Here, as shown in detail in FIGS. 4 and 5, two beads 101 and 102 are formed on a tilted wall 12 of the dashboard lower section 10. The two beads 101 and 102 are formed so as to be positioned above the floor frame 91. The two beads 101 and 102 protrude towards a cabin 3 side. In addition, the beads 101 and 102 are formed along the upper-lower direction. At the same time, the beads 101 and 102 are formed so as to extend throughout the entire tilted wall 12.

In other words, the upper ends 101a, 102a of the beads 101, 102 extend to the boundary part 71 between the longitudinal wall 11 and the tilted wall 12. As a result, the upper ends 101a, 102a of the beads 101, 102 are connected to the longitudinal wall 11. Meanwhile, the lower ends 101b, 102b of the beads 101, 102 are connected to the horizontal wall 7.

In addition, among the two beads 101 and 102, the bead 101 positioned toward a center in the left-right direction is formed so that the ridge line 101c of the bead 101 overlaps with the ridge line 91a of the floor frame 91 in the upper-lower direction. (See line L2 in FIG. 5.) Here, the floor frame 91 is provided, in an extending manner, to the triangular region T formed by the front side frame bracket 92 and the side sill front extension 93. Consequently, the bead 101 is formed at a position corresponding to the triangular region T of the tilted wall 12 of the dashboard lower section 10.

Furthermore, the width W1 of the bead 101 in the left-right direction is set to be smaller than the width W3 of the floor frame 91 in the left-right direction. The width W2 of the bead 101 in the left-right direction is also set to be smaller than the width W3 of the floor frame 91 in the left-right direction.

In addition, a retreating bead 103 is formed on the tilted wall 12 at a position corresponding to the bolt 99 inserted to the bracket 97 for attaching a subframe. This retreating bead 103 is provided so as to dodge this bolt 99. The retreating bead 103 bulges towards the cabin 3 side. The retreating bead 103 is formed at a position corresponding to the bolt 99. As a result, a part of the retreating bead 103 overlaps with a part of the bead 102 at an outer side in the left-right direction, among the two beads 101 and 102.

Furthermore, since the retreating bead 103 is bulging so as to dodge the bolt 99, a slightly lower side of the retreating bead 103 compared to approximately the central portion in the upper-lower direction is bulging the most. Thus, the height of the bulging is lower towards the longitudinal wall 11. Therefore, the retreating bead 103 is configured to be a non-linear form such that a ridge line 103a is formed at a central portion of the left and right width direction. This ridge line 103a is extended in the upper and lower direction. The retreating bead 103 is also configured so that a tip of the retreating bead 103 becomes smaller in diameter towards the longitudinal wall 11 side.

When the vehicle frontal structure 1 is assembled according to this configuration, a tip of the bolt 99 is put in contact with a reverse surface (lower surface) of the retreating bead 103 of the dashboard lower section 10. The bolt 99 is inserted into the bracket 97 for attaching a subframe. In this way, the relative positions of the dashboard lower section 10 and the bracket 97 for attaching a subframe are determined. Furthermore, the relative positions of the bifurcation part 90 and the dashboard lower section 10 are determined. The bracket 97 for attaching a subframe is assembled to the bifurcation part 90. In addition, the relative positions of the dashboard lower section 10 and the floor frame 91 are determined.

In other words, by putting the tip of the bolt 99 in contact with the retreating bead 103 of the dashboard lower section 10, the relative positions of the dashboard lower section 10 and the floor frame 91 are determined.

Next, based on FIGS. 5 and 8, the frontal collision load applied to the dashboard lower section 10 is described. In addition, the features of the beads 101, 102 and the floor frame 91 with respect to this frontal collision load are described as well.

Here, the front side frame 4a, 4b are configured so as to be bent and deformed at an intermediary section in the front-rear direction towards an upper direction, so that the frontal collision load is absorbed.

In other words, at the time of a frontal collision, the front side frame 4a, 4b deforms, with a rear end being the center, so that the portion of the front side frame 4a, 4b positioned in front of the rear end bends upwards. (See the double dashed line and the arrow Y1 in FIG. 8.) Furthermore, a load is imposed on the tilting wall 12 of the dashboard lower section 10. This load is directed in a lower diagonal direction. In other words, a load is imposed in a direction of compression. (See the arrow Y2 in FIGS. 5 and 8.)

Here, as shown in detail in FIG. 5, two beads 101 and 102 are formed on the tilted wall 12 of the dashboard lower section 10 along the upper-lower direction. At the same time, the beads 101 and 102 are formed so as to extend throughout the entire tilted wall 12. In other words, the two beads 101, 102 are formed along the direction of the load (i.e., the direction of compression) imposed on the dashboard lower section 10. Therefore, the dashboard lower section 10 can obtain a high degree of robustness against a load that is imposed in a direction of compression. As a result, bending and deforming are reduced.

In particular, the triangular region T, formed by the front side frame bracket 92 and the side sill front extension 93, are prone to being bent or deformed due to the frontal collision load. However, since the bead 101 is formed at a position corresponding to the triangular region T of the tilted wall 12, the triangular region T is restrained from being bent or deformed.

In addition, the load imposed on the dashboard lower section 10 is transmitted to the floor frame 91 positioned below the dashboard lower section 10 (the floor panel 9). (See arrow Y3 of FIGS. 5 and 8.) At this time, among the two beads 101 and 102 formed on the tilted wall 12 of the dashboard lower section, the bead 101 positioned toward a center in the left-right direction is formed so that the ridge line 101c of the bead 101 overlaps with the ridge line 91a of the floor frame 91 in the upper-lower direction. (See line L2 in FIG. 5.)

Each ridge line 101c, 91a are extended along a direction in which the load is received (i.e., the direction of compression). In other words, since the ridge lines 101c, 91a are overlapped, a high degree of robustness is obtained with respect to a load in the direction of compression. As a result, the frontal collision load may be adequately received by the front frame 91 via the bead 101.

Therefore, according to the embodiment described above, two beads 101, 102 are formed on the tilted wall 12 of the dashboard lower section 10. Among these beads 101 and 102, the ridge line 101c of the bead 101, positioned toward a center in the left-right direction, overlaps with the ridge line 91a of the floor frame 91 in the upper-lower direction. Therefore, it is possible to enhance the resistance of the dashboard lower section 10 against collisions.

Furthermore, the widths W1, W2 of the beads 101, 102 in the left-right direction are set to be smaller than the width W3 of the floor frame 91 in the left-right direction. As a result, it is possible to reduce the height of the bulging of each of the beads 101, 102. At the same time, it is possible to prevent the space within the cabin 3 from decreasing. Further, it is possible to enhance the rigidity of the dashboard lower section 10 against a load being applied in the direction of compression.

Furthermore, the bead 101 is formed at a position corresponding to the triangular region T of the tilted wall 12. Therefore, the bending and deforming of the triangular region T are restrained. In this way, it is possible to further enhance the resistance of the dashboard lower section 10 against collisions.

Further, each floor frame 91, 91, as well as the front side frame 4a, 4b are positioned over a single line (the center line L1) (see FIG. 6). Therefore, it is possible to reinforce the floor frame 91 with a bead 101 formed on the straight line L2. Thus, it is not necessary to enlarge the floor frame 91 or to thicken the floor frame 91 in order to enhance the robustness of the floor frame 91. As a result, it is possible to reduce the weight of the floor frame.

In addition, when the vehicle frontal structure 1 is assembled according to this configuration, a tip of the bolt 99 is put in contact with a reverse surface (lower surface) of the retreating bead 103 of the dashboard lower section 10. The bolt 99 is inserted into the bracket 97 for attaching a subframe. As a result, the relative positions of the dashboard lower section 10 and the floor frame 91 are determined. Therefore, it is possible to increase the precision of assembly. It is also possible to enhance the operability of the assembly. Further, the plurality of beads 101, 102 may be easily formed.

The present invention is not limited to the embodiment described above. The present invention encompasses multiple variations obtained by varying the embodiment described above within the gist of the present invention.

For example, in the embodiment described above, an instance was described in which two beads 101 and 102 are formed on a tilted wall 12 on the dashboard lower section 10. However, the present invention is not limited to this embodiment. At least one bead may be formed on the tilted wall 12 in a direction in which the floor frame 91 extends.

Further, according to the above embodiment, an instance was described in which metallic welding of various components was made by spot-welding. However, the present invention is not limited to this embodiment. A known metallic welding method such as arc welding like TIG (Tungsten Inert Gas) welding, MIG (Metallic Inert Gas) welding, and plasma welding; laser welding; and electron beam welding may be used as well, as appropriate.

Further, according to the embodiment described above, a configuration was described in which the bracket 97 for attaching a subframe is provided at a triangular region T formed by the front side frame bracket 92 and the side sill front extension 93. Under this configuration, the subframe 98 was fixed via a bolt 99 to the bracket 97 for attaching a subframe. However, the present invention is not limited to this configuration, as long as the subframe 98 is fixed. For example, a pin may be used instead of the bolt 99. In this case, the position of the dashboard lower section 10 may be determined by protruding the tip of the pin above the reinforcer 89.

Moreover, according to the above configuration, among the two beads 101 and 102, the ridge line 101c of the bead 101 positioned toward a center in the left-right direction is formed so that the ridge line 101c of the bead 101 overlaps with the ridge line 91a of the floor frame 91 in the upper-lower direction. However, the present invention is not limited to this configuration. For instance, the bead 102 may be formed to overlap with the ridge line 91a of the floor frame 91 in the upper-lower direction. According to this configuration, it is possible to enhance the rigidity of the dashboard lower section 10 against a load imposed in the direction of compression.

The invention claimed is:

1. A frontal structure of a vehicle comprising:
   a dashboard lower section;
   a longitudinal wall extending along the dashboard lower section in a perpendicular direction;

a tilted wall extending as a descending slope from a lower portion of the longitudinal wall towards a rear direction;

a horizontal wall extending from a lower portion of the tilted wall towards a rear direction and a horizontal direction;

a floor frame provided below the dashboard lower section, the floor frame extending along a front-rear direction;

at least one longitudinal bead formed on the tilted wall along a direction in which the floor frame extends so that an upper end part of the longitudinal bead is connected to the longitudinal, a lower end part is connected to the horizontal wall, and at least one a ridgeline of the longitudinal bead overlaps with a ridgeline of the floor frame in an upper-lower direction; and a bifurcation part provided at a rear end of a front side frame which is placed at an engine room side of the dashboard lower section, wherein the bifurcation part comprises a first extension part and a second extension part, the first extension part extending from a rear end of the front side frame towards a tunnel part formed at a central lower part of the dashboard lower section, and the second extension part extending from the rear end of the front side frame towards a side sill provided at a left and right side part of the dashboard lower section;

the longitudinal bead is formed at a position corresponding to a triangular region formed by the first extension part and the second extension part of the bifurcation part;

the floor frame is provided in the triangular region; and the floor frame and the front side frame are placed along a line.

2. A frontal structure of a vehicle according to claim 1, wherein a plurality of longitudinal beads are formed on the dashboard lower section; and a width of each of the plurality of longitudinal beads in a left-right direction is smaller than a width of the floor frame in the left-right direction.

3. The frontal structure of a vehicle according to claim 1, further comprising:

a subframe fixed and connected to a lower side of the dashboard lower section via the bifurcation part; and a retreating bead provided so as to avoid contacting a fixing component fixing and connecting the subframe and the dashboard lower section, wherein a position of the longitudinal bead is determined to be at a position corresponding to the floor frame by making the retreating bead abut against the fixing component.

* * * * *